(12) United States Patent
Haug

(10) Patent No.: US 7,265,527 B1
(45) Date of Patent: Sep. 4, 2007

(54) DIRECT CURRENT MULTIPLIER

(75) Inventor: Eberhard Haug, Kirchheim unter Teck (DE)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 11/549,072

(22) Filed: Oct. 12, 2006

(51) Int. Cl.
G05F 1/00 (2006.01)
H02M 3/156 (2006.01)

(52) U.S. Cl. .................. 323/282; 323/284; 323/351

(58) Field of Classification Search ............... 323/282, 323/284, 351; 327/536
See application file for complete search history.

(56) References Cited

U.S. PATENT DOCUMENTS

| | | | | |
|---|---|---|---|---|
| 6,225,871 B1 * | 5/2001 | Chien | ............... | 331/117 FE |
| 6,366,028 B1 * | 4/2002 | Wener et al. | ............ | 315/241 P |
| 6,750,727 B1 * | 6/2004 | Sutardja | ............... | 331/117 R |
| 6,812,802 B1 * | 11/2004 | Godambe et al. | ............ | 331/183 |
| 6,995,603 B2 * | 2/2006 | Chen et al. | ............... | 327/536 |
| 7,154,252 B2 * | 12/2006 | Arthur | ............... | 323/282 |

* cited by examiner

Primary Examiner—Bao Q. Vu
(74) Attorney, Agent, or Firm—Patent Law Group LLP; Brian D. Ogonowsky

(57) ABSTRACT

A self-oscillating DCM is disclosed comprising two inductors that charge and discharge 180 degrees out of phase such that the charging inductor is conducting an upward ramping current and the discharging inductor is conducting a downward ramping current. A load receives the upward and downward ramping currents, which combine to create a constant current. The current source that powers the DCM is current limited so as to output a maximum direct current of $I_{IN}$. A relatively small capacitor is connected across the input terminals of the DCM and allows the inductors to ramp up to a peak current of $2*I_{IN}$. Since the current source only supplies the ramping current to one of the inductors at a time up to $2*I_{IN}$, and the average current conducted by each inductor is $I_{IN}$, the current supplied by the current source is a constant $I_{IN}$. However, since the inductors simultaneously supply two oppositely ramping currents to the load, the load current is a constant current equal to $2*I_{IN}$. So the DCM doubles the supply current and halves the average input voltage.

25 Claims, 6 Drawing Sheets

DIRECT CURRENT MULTIPLIER

FIELD OF INVENTION

This invention relates to current converter technology and, in particular, to a direct current multiplier (DCM) that generates very low noise.

BACKGROUND

Various techniques are known to multiply a current. A current multiplier generates a current at an output that is higher than the current supplied by the power supply. Since power is conserved, an increased current output results in an output voltage that is lower than the input voltage.

Some current multipliers use a pulsed switching technique controlled by an oscillator, where large filters are used to convert a pulsed waveform into a DC current. Such pulsed multipliers generate electromagnetic interference (EMI) and other electrical noise and are relatively large. One such multiplier is a switch-mode DC-DC converter. In some situations, a substantially noiseless converter is required, precluding the use of a switch-mode converter.

A CUK converter is a special topology of DC/DC converter which uses inductive and capacitive energy transfer to generate an output current, with the advantage of low ripple current at the input when supplying a constant load current at the output. For a simple CUK converter, two inductors, a large coupling capacitor, an output filter capacitor, a switch transistor, a diode, and its control circuit are needed. The coupling capacitor must be relatively large for medium and high load currents.

In one example of the need for a current multiplier, a high brightness light emitting diode (LED) only needs a small voltage (e.g., 3.4 volts) but a fairly high current. If the power source is a 12 volt car battery, a converter is used to supply the required current through the LED at 3.4 volts. An idealized converter will thus multiply the current drawn from the battery by 12/3.4. However, known converters generate noise (e.g., a switching converter) or require large coupling capacitors (e.g., CUK converter).

What is needed is a direct current multiplier that is simple, small, and does not generate substantial noise to both the power supply and the load.

SUMMARY

A self-oscillating DCM is disclosed comprising two inductors that charge and discharge 180 degrees out of phase such that the charging inductor is conducting an upward ramping current and the discharging inductor is conducting a downward ramping current. A switching circuit alternately charges and discharges the inductors. A small capacitor is connected across the DCM input terminals. A load receives the upward and downward ramping currents, which combine to create a constant current. A filter capacitor is not needed to filter the inductor waveforms into the load.

The current source that powers the DCM is current limited so as to output a constant maximum current of $I_{IN}$. By using a preferred capacitor value across the DCM input terminals, the peak current conducted by each of the inductors is $2*I_{IN}$. The average current through each inductor is $I_{IN}$. The capacitor charges when the inductor ramping current is below $I_{IN}$ and discharges into the inductor when the inductor ramping current is greater than $I_{IN}$. Since the current source only supplies the ramping current to one of the inductors at a time, while the capacitor is charging and discharging to make up the difference between the ramping current and the supply current, the current supplied by the current source is a constant $I_{IN}$. Since the inductors simultaneously supply two oppositely ramping currents to the load, while one inductor is charging through the load and the other inductor is discharging through the load, the load current is a constant current substantially equal to $2*I_{IN}$. So the DCM effectively doubles the supply current and halves the average voltage from the input to the load.

DCMs may be cascaded to further multiply the current.

DETAILED DESCRIPTION

Figure 1:
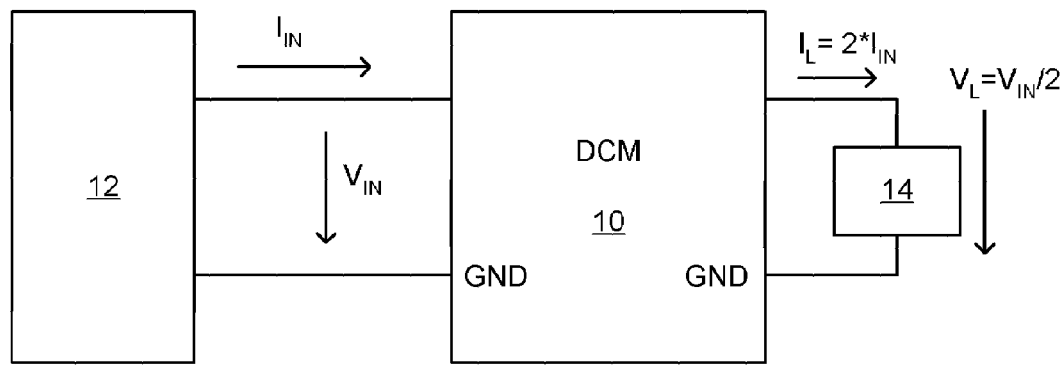
FIG. 1 is a block diagram of a DCM in accordance with the invention.

FIG. 1 illustrates one embodiment of the invention where the direct current multiplier 10 doubles the current from the current source 12. The current to the load 14 is therefore $I_L=2*I_{IN}$, and the output voltage is $V_L=V_{IN}/2$. The DCM 10 can also be configured to multiply the current by other factors. The current source 12 can be any current limited supply that supplies a constant current $I_{IN}$. The current source 12 may be a fixed current source or a current limited voltage source (both being referred to herein as a current source). One way to supply a current-limited current is to use a transistor whose current is sensed and limited to the intended maximum current.

Figure 2:
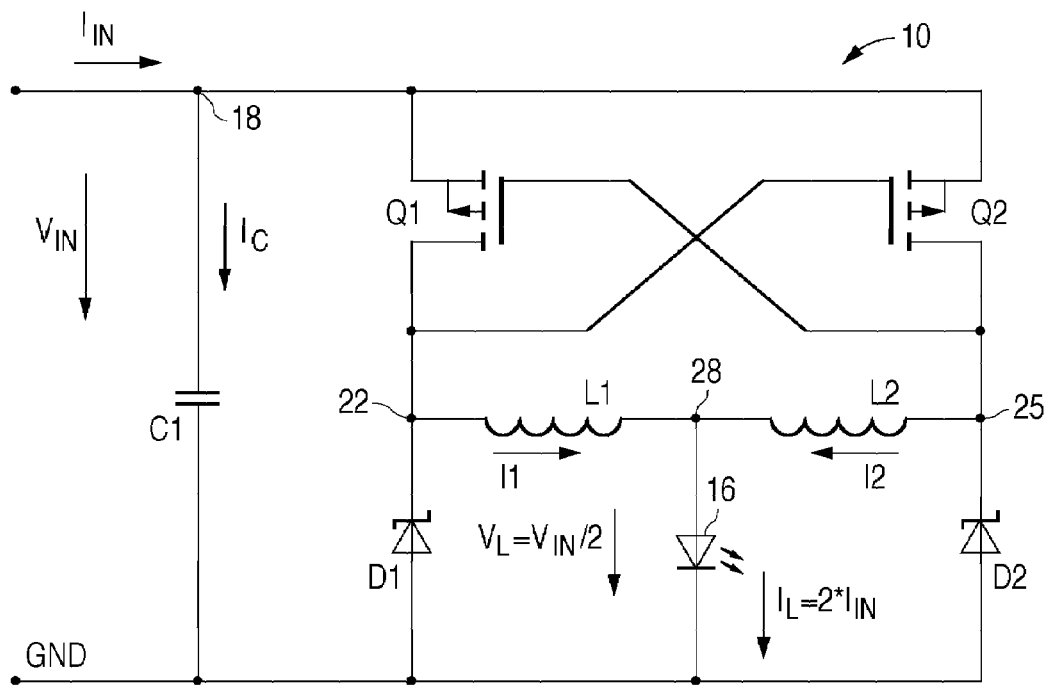
FIG. 2 is a schematic diagram of one embodiment of the DCM of FIG. 1, which doubles the input current.
Figure 3:
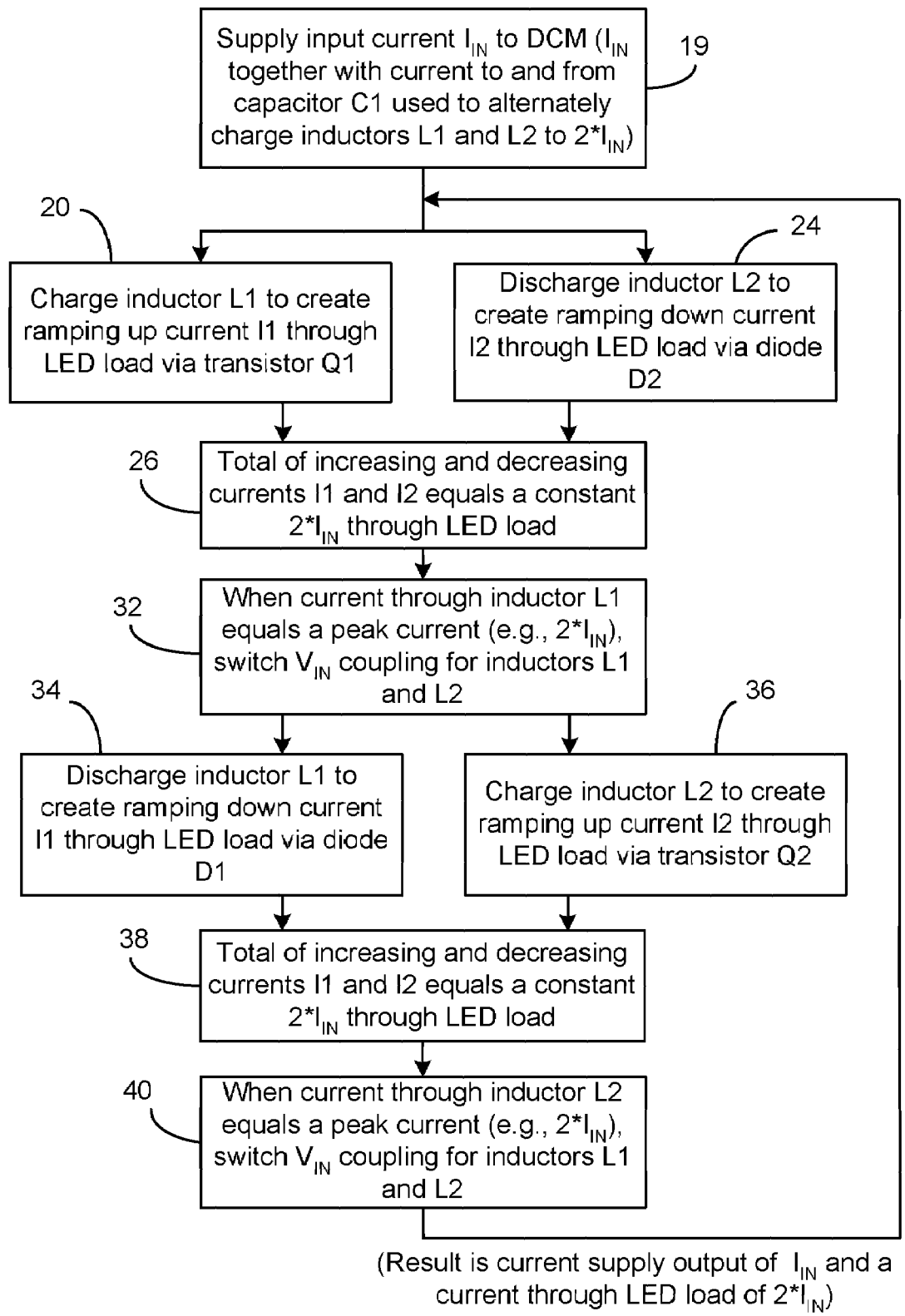
FIG. 3 is a flowchart identifying various steps performed by the circuit of FIG. 2 in its steady state.

FIG. 2 illustrates one embodiment of the DCM 10, which is a self-resonating circuit. The load in the example is a high brightness light emitting diode (LED) 16 that drops about 3.4 volts with a current through it of 350 mA. The current source supplies $I_{IN}=175$ mA. The operation of the DCM 10 of FIG. 2 will be described with reference to the flowchart of FIG. 3 and the current waveforms of FIGS. 4A-4D.

FIGS. 3 and 4A-4D assume a capacitor C1 value of 330 nF and inductor values of 100 µH. The capacitor value is high enough to receive current from the current source and supply current to the inductors to enable the inductors to reach the full peak current of $2*I_{IN}$ per inductor. With significantly smaller values of the capacitor, current to the load will still be doubled, but peak current will decrease and ripple will increase along with other parameters changing.

A rule of thumb to determine a preferred capacitor C1 value may use the following relationship: $C1 \leq L*(I_L)^2/(V_L)^2$, where $L=L1=L2$.

If the capacitor value is much larger than the rule of thumb value, the peak inductor current could be more than double the input current.

A current source supplies an input current $I_{IN}$ to node 18 at a voltage of $V_{IN}$ (step 19).

It will be assumed that the cross-coupled PMOS transistors Q1 and Q2 are in a state where Q1 is on and Q2 is off. In step 20 of FIG. 3, the inductor L1 charges through the series connection of transistor Q1, inductor L1, and LED 16. This results in a ramping current I1 through inductor L1 (FIG. 4A) from time T0 to T1. Since the transistor Q1 node 22 is held at a high voltage (almost $V_{IN}$) during this time, and node 22 is connected to the gate of transistor Q2, transistor Q2 is off.

Figure 4A:
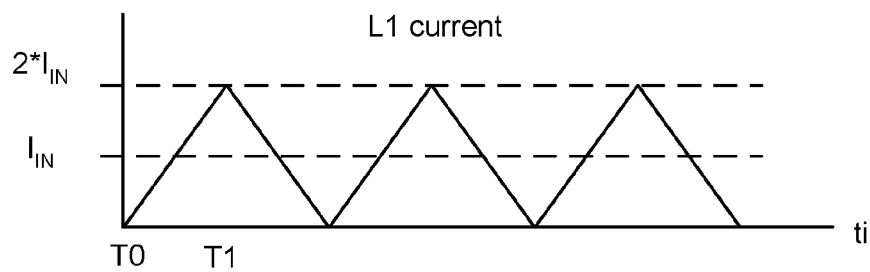
FIGS. 4A-4D illustrate the current waveforms (current vs. time) at various nodes in the circuit of FIG. 2.
Figure 4B:
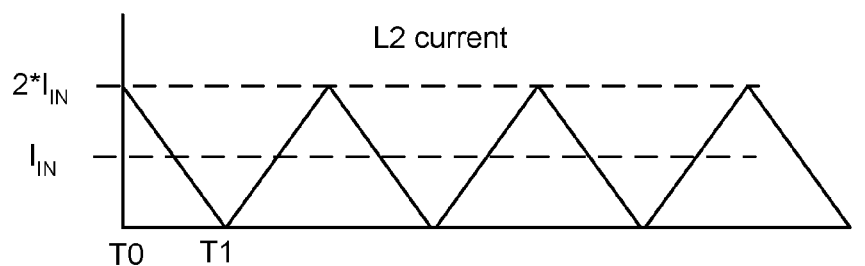

Prior to inductor L1 being charged, it is assumed inductor L2 had been charged from the previous switching cycle until its current I2 reached $2*I_{IN}$. While transistor Q1 is on and inductor L1 is being charged, transistor Q2 is off, and inductor L2 is discharging though the circuit formed by LED 16 and the forward biased diode D2 (step 24). The diodes D1 and D2 are preferably Schottky diodes to achieve a low forward drop. Alternatively synchronous rectifiers may be used to achieve virtually zero voltage drop. As inductor L2 is discharging, the voltage at node 25 is one diode drop below ground. The inductor L2 discharges at the same rate at which it was charged, so it generates a ramping down current, as shown in FIG. 4B from time T0 to T1, at the same time that the inductor L1 is conducting a ramping up current (FIG. 4A). The inductance values of inductors L1 and L2 are the same.

The capacitor C1 stores charge (indicated as a positive current $I_C$ in FIG. 4C) from the current source while the ramping up current is less than $I_{IN}$ and discharges into the inductor (indicated as a negative current $I_C$ in FIG. 4C) when the ramping up current exceeds $I_{IN}$.

Figure 4C:
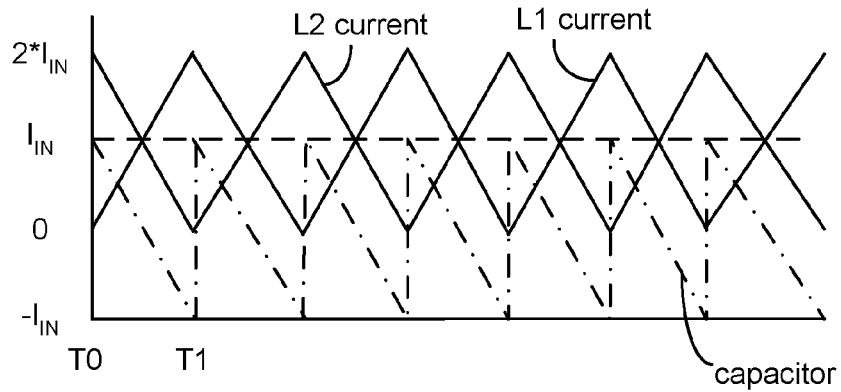
Figure 4D:
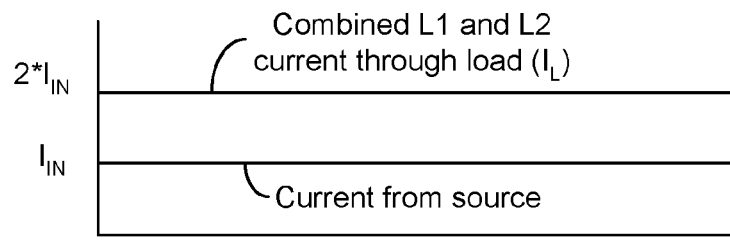

As shown in step 26, the total current supplied through the LED 16 from inductors L1 and L2 is a steady $2*I_{IN}$. The combined inductor waveforms are shown in FIG. 4D as a steady current through the LED 16 equal to $2*I_{IN}$.

If the inductor values are not equal, they will behave differently. The basic function of the DCM will be the same, but the current transmission ratio $I_L/I_{IN}$ will be less than 2. For adjusting the output current, it is better to adjust the input current rather than using unmatched inductor values.

When the ramping current I1 reaches its possible maximum (in this case $2*I_{IN}$), the ramping will stop, and the voltage at node 22 will drop to approximately the voltage at node 28 (due to v=Ldi/dt). It is assumed in the example that the LED 16 is dropping 3.4 volts, so the voltage at node 28 is 3.4 volts. Since the gate voltage of transistor Q2 is now well below its source voltage of 6.8 volts (because the DCM is a current doubler), transistor Q2 will turn on, which raises the voltage at node 25 to approximately 6.8 volts to turn off transistor Q1 (step 32).

Now that transistors Q1 and Q2 have changed states, inductor L1 discharges (step 34) through the LED 16 and diode D1 is forward biased, and inductor L2 charges (step 36) due to the series connection of transistor Q2, inductor L2, and LED 16. Since diode D1 is now forward biased, the voltage at node 22 is pulled down to one diode drop below ground. The inductor waveforms are shown in FIGS. 4A-4C, and the combined waveforms are shown in FIG. 4D as a steady current through the LED 16 equal to $2*I_{IN}$ (step 38).

As soon as inductor L2 conducts $2*I_{IN}$, the voltage at node 25 goes low to switch transistors Q1 and Q2, and the self-resonating process repeats (step 40). For an optimized value of the capacitor C1, the time for one half cycle can be calculated (idealized) as $T_H=L*\Delta I1/V_L$, where L is the inductance of either matched inductor, $I_L$ is the load current, $\Delta I1$ is the inductor current change (equal to $2*I_{IN}$), and $V_L$ is the voltage across the load (equal to the driving voltage across the inductors). Therefore, the oscillator frequency is $f=1/(2*T_H)=V_L/(2*L*\Delta I1)=V_L/(4*L*I_{IN})$. For the component values mentioned above, the oscillating frequency can be estimated to be about 40-50 kHz.

Since only one inductor is being charged at a time, the current drawn from the current source 12 (FIG. 1) is $I_{IN}$. However, since the current through the LED 16 is a combination of the two inductors L1 and L2 contributing increasing and decreasing currents (I1 and I2), offset by 180 degrees, the current through the LED is $2*I_{IN}$, which is double the current from the current source 12 (FIG. 4D).

Since the current is doubled, and the voltage across the LED 16 is 3.4 volts at the double current, the average voltage at the input node 18 is about 6.8 volts. Because of the charging and discharging of the capacitor C1, the voltage at the input node 18 will contain some ripple, where the ripple magnitude is dependent on the component values used in the DCM.

The small capacitor C1 connected across the DCM input terminals helps start the oscillator, stabilizes the oscillator, prevents switching noise being reflected back to the current source, affects settling time, affects peak inductor current, affects efficiency, and affects ripple of the load current. The value of capacitor C1 may be optimized for a desired inductor peak current (e.g., $2*I_{IN}$). As a result, the LED current and the input current to the DCM have very low ripple. Any ripple can be further reduced by providing a capacitor across the load.

Figure 5:
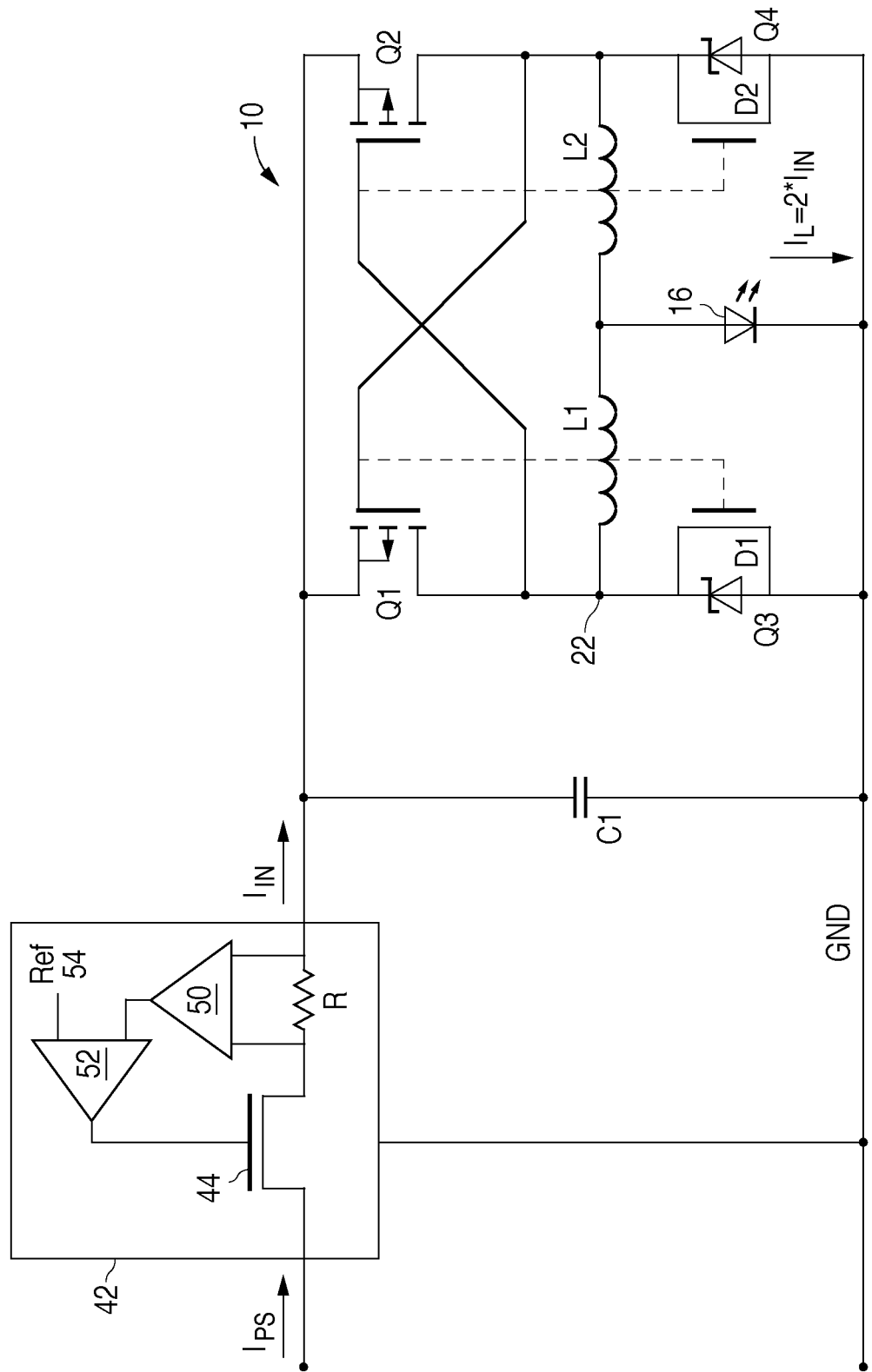
FIG. 5 is a diagram of the circuit of FIG. 2 where a current-limited LDO regulator supplies the current to the DCM and synchronous rectifiers are used.

The current source 12 (FIG. 1) may take many forms such as a battery or a DC/DC converter that includes current limiting circuitry. FIG. 5 illustrates the current-limited current source being an LDO regulator 42 (also called a linear regulator). The LDO regulator 42 contains a series transistor 44, which may be either a MOSFET (in the simplest case a depletion mode MOSFET) or a bipolar transistor. A power supply, such as a car battery, supplies a voltage and current (Ips) to an input port of the LDO regulator 42. The series transistor 44 is connected between the input port and the output port, supplying all the current to the DCM. The transistor 44 is designed to limit at the intended current so that no further control voltage to the gate or base of transistor 44 increases the current beyond $I_{IN}$.

FIG. 5 shows a simple current limit feedback circuit. The current $I_{IN}$ passes through a low value resistor R. A first differential amplifier 50 senses the voltage drop across the resistor R, which is proportional to the current. Any other technique for detecting the current can be used instead. A second differential amplifier 52 senses the difference between the actual current and a reference signal 54. The output of the differential amplifier 52 controls the transistor so that the current feedback signal matches the reference signal 54.

The LDO regulator 42 output voltage will have a ripple, with the average voltage being about twice the load voltage.

LDO regulators are less efficient than switch-mode converters at medium to high current levels due to the voltage drop across the series transistor (power loss=voltage drop multiplied by current). Since the power wasted by an LDO regulator is directly proportional to the current conducted by the series transistor, reducing the current through the series transistor by one-half doubles the efficiency of the circuit of FIG. 5.

The LDO regulator 42 and DCM 10 may be integrated on a single chip. However, inductors will usually be provided external to the chip. The inductors are not magnetically coupled. If Schottky diodes D1 and D2 were augmented with synchronous rectifiers (switched transistors with zero voltage drop), the DCM would have virtually 100% efficiency and a current transfer ratio $I_L/I_{IN}$ of 2. The synchronous rectifiers may be NMOS transistors Q3 and Q4 whose gates are coupled to the respective gates of PMOS transistors Q1 and Q2 such that, when a high signal applied to the gate of transistor Q1 turns transistor Q1 off, the high signal applied to the NMOS transistor Q3 switches transistor Q3 on. Conversely, when a high signal applied to the gate of transistor Q2 turns transistor Q2 off, the high signal applied to the NMOS transistor Q4 switches transistor Q4 on. The transistors and couplings would be designed to prevent shoot-through current. The oppositely switching transistor pairs Q1/Q3 and Q2/Q4 in FIG. 5 may each be a CMOS power inverter. Good transistor matching may allow elimination of the Schottky diodes.

A synchronous rectifier may instead be formed as a transistor which is switched on or off based on a polarity of the voltage across its terminals.

Circuit simulations confirmed that the efficiency of the DCM can be as high as 99.8%, providing an actual current transfer ratio of about 1.99.

The current-limited current supply 42 in FIG. 5 may even be a switch-mode power supply, where the current supplied is one-half of the current driving the load. This increases the efficiency of the power supply, lowers ripple, and lowers noise. The DCM and switch-mode power supply can be integrated on the same chip.

The DCM can even be driven by solar cells or other current generators.

Instead of the load being an LED or other conventional load (resistive or non-linear), the DCM may drive a conventional LDO regulator, which outputs a regulated voltage to a load. The LDO regulator drives the load at twice the input current of the DCM. Such an arrangement allows one to supply the DCM (located in-between) by a non-current-limited voltage source/battery because the load current normally is set by the LDO regulator's regulated voltage divided by the load resistance ($I_L=V_L/R_L$). For stable behavior, because of voltage ripple injected into the capacitor C1, the DCM should be decoupled from the battery by, for example, a diode.

Figure 6:
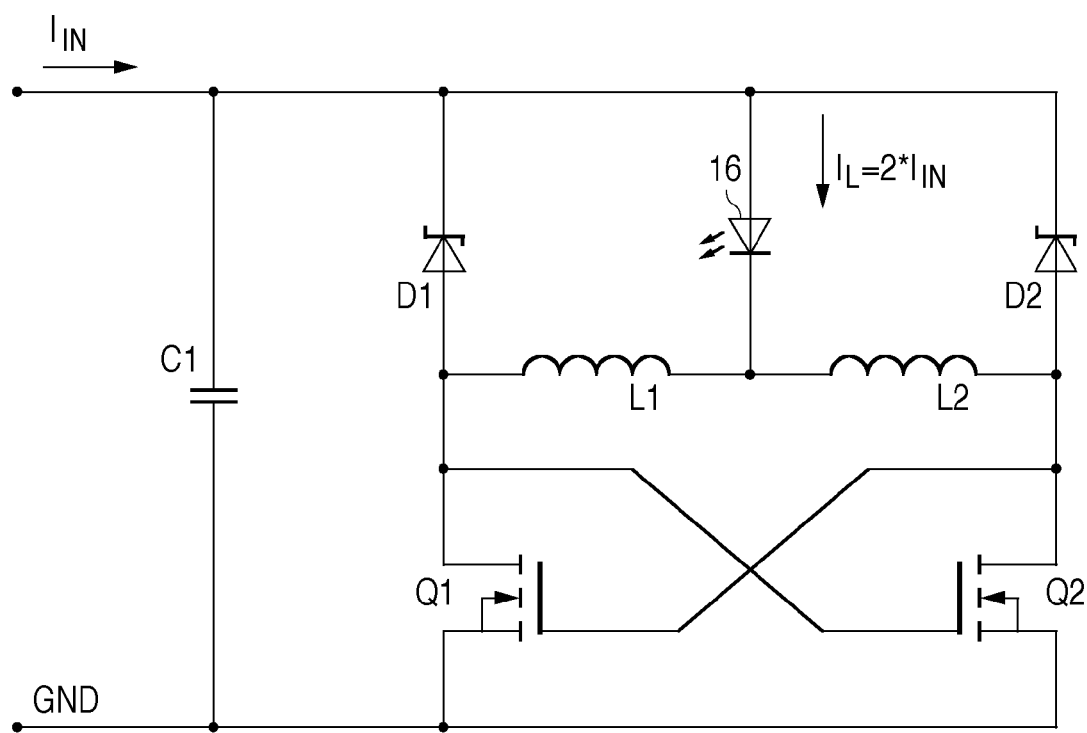
FIG. 6 is a circuit similar to FIG. 2 but using low-side NMOS transistors.

FIG. 6 illustrates the DCM where the transistors Q1 and Q2 are low-side NMOS transistors. When transistor Q1 is on, inductor L1 is charged through the series connection of the LED 16, inductor L1, and transistor Q1. During discharge, inductor L1 conducts through the LED 16 and forward biased diode D1. When transistor Q2 is on, inductor L2 is charged through the series connection of the LED 16, inductor L2, and transistor Q2. During discharge, inductor L2 conducts through the LED 16 and forward biased diode D2. The operation is the same as described in FIG. 3.

Various other switching arrangements may be used.

Figure 7:
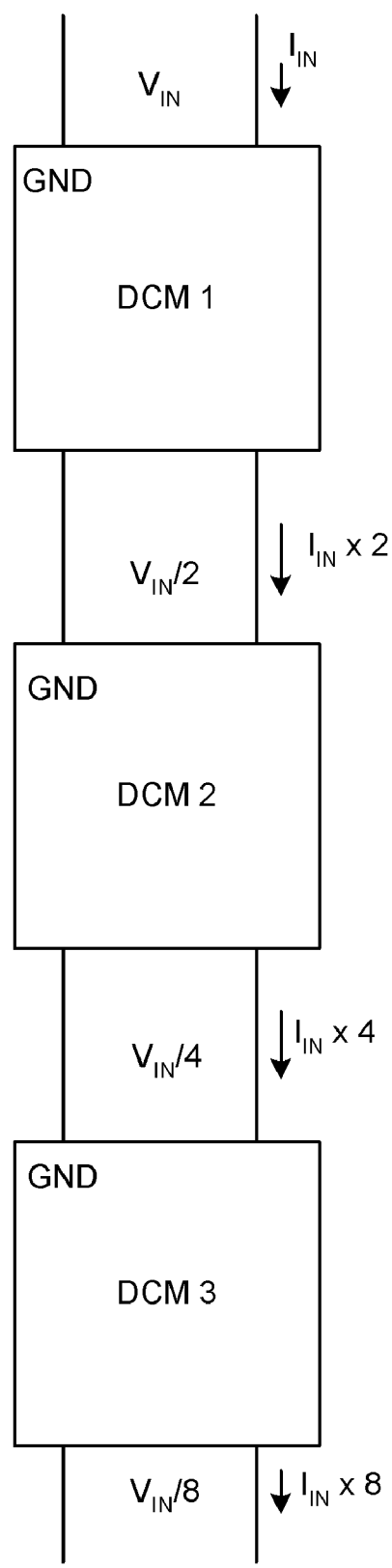
FIG. 7 illustrates how multiple DCMs can be cascaded to provide additional current multiplication.

FIG. 7 illustrates how multiple DCMs (DCMs 1-3) can be cascaded to provide additional current multiplication. Each DCM doubles the current, and the resulting voltage is halved. Such arrangements are particularly suitable when high voltage power supplies are used for powering high current loads.

The voltage/current source for the DCM may also supply a voltage that is negative with respect to ground. It would be understood that, since the direction of current flow would be reversed, the applicable components (e.g., diodes, LED) would have to be connected in opposite directions, and opposite type transistor would be used. The operation of the DCM will be the same. Alternatively, the negative current source may be connected to the ground terminal in the various figures, with the other terminal connected to ground.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A current generating circuit comprising:
    a first current source generating a substantially constant input current $I_{IN}$; and
    a direct current multiplier (DCM) having input terminals connected to receive the constant input current $I_{IN}$, the DCM comprising:
      a capacitor coupled across the DCM input terminals;
      a switching circuit comprising a first transistor and a second transistor that are connected to have opposite states;
      a first inductor coupled between the first transistor and a first terminal of a load, the first inductor conducting a ramping current to the load through the first transistor up until a peak current when the first transistor is turned on, the first transistor and the second transistor being connected such that the first transistor turns off when the first inductor conducts the peak current;
      a second inductor coupled between the second transistor and the first terminal of the load, the second inductor conducting a ramping current to the load through the second transistor up until a peak current when the second transistor is turned on, the first transistor and the second transistor being connected such that the second transistor turns off when the second inductor conducts the peak current;
      a first rectifying element coupled to the first inductor, the first rectifying element conducting a discharge current through the first inductor and the load when the first transistor is turned off; and
      a second rectifying element coupled to the second inductor, the second rectifying element conducting a discharge current through the second inductor and the load when the second transistor is turned off;
      the capacitor, first transistor, second transistor, first inductor, second inductor, first rectifying element, and second rectifying element forming a self-resonating circuit when the load is connected to the first inductor and second inductor,
    wherein the direct current multiplier generates a current through the load that is substantially double the input current $I_{IN}$ supplied by the current source.

2. The circuit of claim 1 wherein the current source is a current-limited linear regulator.

3. The circuit of claim 1 wherein the first rectifying element and the second rectifying element are diodes.

4. The circuit of claim 1 wherein the wherein the first rectifying element and the second rectifying element are synchronous rectifiers.

5. The circuit of claim 1 wherein the peak current for the first inductor and the second inductor is substantially double the input current $I_{IN}$.

6. The circuit of claim 1 wherein the peak current for the first inductor and the second inductor is less than double the input current $I_{IN}$.

7. The circuit of claim 1 wherein the current source is a current limited voltage regulator.

8. The circuit of claim 7 wherein the current source is a linear regulator.

9. The circuit of claim 1 wherein the current source is a current limited battery.

10. The circuit of claim 1 wherein the current source is a fixed current source.

11. The circuit of claim 1 wherein the first transistor is connected between a positive voltage terminal of the current source, relative to another terminal of the current source, and the first inductor, and the second transistor is connected between the positive voltage terminal of the current source and the second inductor.

12. The circuit of claim 1 wherein the first transistor is connected between a negative voltage terminal of the current source, relative to another terminal of the current source, and the first inductor, and the second transistor is connected between the negative voltage terminal of the current source and the second inductor.

13. The circuit of claim 1 wherein the first transistor is connected between a reference voltage terminal of the current source and the first inductor, and the second transistor is connected between the reference voltage terminal of the current source and the second inductor.

14. The circuit of claim 1 wherein a second terminal of the load is connected to a reference voltage.

15. The circuit of claim 1 wherein a second terminal of the load is connected to a positive voltage terminal of the current source.

16. The circuit of claim 1 wherein a second terminal of the load is connected to a negative voltage terminal of the current source.

17. The circuit of claim 1 further comprising one or more additional DCMs cascaded to further multiply the input current $I_{IN}$.

18. The circuit of claim 1 wherein the first transistor and the second transistor are PMOS transistors.

19. The circuit of claim 1 wherein the first transistor and the second transistor are NMOS transistors.

20. A current multiplication technique comprising:
generating a substantially constant input current $I_{IN}$ by a first current source;
self-oscillating a switching circuit comprising a first transistor and a second transistor so that the first transistor and the second transistor have opposite states;
conducting a ramping current through a first inductor to a load through the first transistor up until a peak current when the first transistor is turned on;
turning off the first transistor and turning on the second transistor when the first inductor conducts the peak current;
conducting a ramping current through the second inductor to the load through the second transistor up until a peak current when the second transistor is turned on;
turning off the second transistor and turning on the first transistor when the second inductor conducts the peak current;
conducting a discharge current through the first inductor, a first rectifying element, and the load when the first transistor is turned off; and
conducting a discharge current through the second inductor, a second rectifying element, and the load when the second transistor is turned off;
wherein the first transistor, second transistor, first inductor, second inductor, first rectifying element, and second rectifying element form a self-resonating circuit when the load is connected to the first inductor and second inductor, and
wherein the direct current multiplier generates a current through the load that is substantially double the input current $I_{IN}$ supplied by the current source.

21. The method of claim 18 wherein the current source is a current-limited linear regulator.

22. The method of claim 18 wherein the first rectifying element and the second rectifying element are diodes.

23. The method of claim 18 wherein the wherein the first rectifying element and the second rectifying element are synchronous rectifiers.

24. The method of claim 18 wherein the peak current for the first inductor and the second inductor is substantially double the input current $I_{IN}$.

25. The method of claim 18 wherein the peak current for the first inductor and the second inductor is less than double the input current $I_{IN}$.

* * * * *

UNITED STATES PATENT AND TRADEMARK OFFICE
CERTIFICATE OF CORRECTION

| | |
|---|---|
| PATENT NO. | : 7,265,527 B2 |
| APPLICATION NO. | : 11/549072 |
| DATED | : September 4, 2007 |
| INVENTOR(S) | : Eberhard Haug |

It is certified that error appears in the above-identified patent and that said Letters Patent is hereby corrected as shown below:

Column 6, line 55, claim 4:  Cancel "wherein the wherein the" and substitute --wherein the--.

Column 8, line 32, claim 23:  Cancel "wherein the wherein the" and substitute --wherein the--.

Signed and Sealed this

Fourteenth Day of October, 2008

JON W. DUDAS
*Director of the United States Patent and Trademark Office*